Aug. 23, 1966    R. C. MEYER ET AL    3,268,812
TIME INTERVAL MEASURING APPARATUS INCLUDING A BEAM INTERSECTING
SCANNING MEANS FOR DETERMINING THE PARAMETERS OF
A BEAM OF CHARGED PARTICLES
Filed March 12, 1962    3 Sheets-Sheet 1

INVENTORS
RICHARD C. MEYER
JAMES A. WHITE
BY
AGENT

SCAN WIRE

MAGNETIC PICKUP

ELECTRON BEAM

INVENTORS
RICHARD C. MEYER
JAMES A. WHITE

BY

AGENT

United States Patent Office 3,268,812
Patented August 23, 1966

3,268,812
TIME INTERVAL MEASURING APPARATUS INCLUDING A BEAM INTERSECTING SCANNING MEANS FOR DETERMINING THE PARAMETERS OF A BEAM OF CHARGED PARTICLES
Richard C. Meyer, Thompsonville, and James A. White, Granby, Conn., assignors to United Aircraft Corporation, East Hartford, Conn., a corporation of Delaware
Filed Mar. 12, 1962, Ser. No. 179,176
16 Claims. (Cl. 324—71)

This invention relates to novel apparatus for measuring the paramenters of a beam of charged particles. More particularly this invention relates to apparatus for determining the location, size, shape, focus and energy distribution of an electron beam in an apparatus which uses such beam to weld, drill, or perform other operations on any material.

Electron beam machines, as they are commonly known, are devices which use the kinetic energy of an electron beam to work a material. U.S. Patent No. 2,793,281, issued May 21, 1957, to K. H. Steigerwald, discloses such a machine. These machines operate by generating a highly focused beam of electrons which is caused to impinge upon a work piece. The electron beam is a welding, cutting and machining tool which has practically no mass but has high kinetic energy because of the extremely high velocity imparted to the electrons. Transfer of this kinetic energy to the lattice electrons of the work piece generates higher lattice vibrations which causes an increase in temperature within the impingement area sufficient to accomplish work.

Prior art electron beam machines use optical systems including microscopes for visually observing the location and focusing of the beam. An example of such a system is disclosed in U.S. Patent No. 2,944,172, to Opitz et al., issued July 5, 1960. These optical systems have the disadvantages of high cost, relatively poor accuracy, and the inability to instantaneously sense beam location. Also, use of an optical system does not permit determination of beam shape, size and energy distribution. In many operations performed with electron beam machines, such as drilling holes in spinnerettes used in the production of "nylon," knowledge of quantities such as beam shape and size is necessary. This is because these holes must be circular in shape and have a diameter of .1 millimeter. Prior practice consisted of drilling a hole with the beam, measuring the hole under a powerful microscope, and repeating the operation until the desired size and shape hole was obtained. This was particularly time consuming inasmuch as it required drilling sample pieces which were taken out of the vacuum chamber for examination.

This invention overcomes the above disadvantages by providing novel apparatus for scanning the beam and using signals generated by the scanning apparatus to compute beam parameters.

It is, therefore, an object of this invention to provide novel apparatus for scanning a beam of charged particles.

It is another object of this invention to sense the location of a beam of charged particles.

It is another object of this invention to automatically sense the location and directionality of a beam of charged particles and provide an indication thereof.

It is also an object of this invention to sense the location and directionality of a beam of charged particles in order to determine the focus thereof.

It is yet another object of this invention to sense the size, shape, and energy distribution of a beam of charged particles.

It is still another object of this invention to provide simple, electro-mechanical apparatus for continuously scanning a beam of charged particles.

In accordance with these and other objects there is provided, in a preferred embodiment of this invention, a pair of vertically spaced scanners which are rotated about a common axis. Each scanner comprises a pair of radially extending wires located in the same plane. At the outer extremities of the radial wires there are connected a pair of wires formed in the shape of a V having its apex located closer to the common axis than the wire extremities. A pole piece, rotating with the scanner, induces a voltage in a stationary pick-up coil to initiate operation of a first counter. Thereafter, when the first scan wire of a first scanner intersects the beam of charged particles, the first counter is cut off. The counts stored in the first counter provide an indication of the beam angular position relative to the stationary pick-up coil. As the first scanner continues to rotate, the time between the first scan wire inersection of the beam and a second intersection with a first one of the V shaped scan wires gives an indication of the radial position of the beam. To determine beam size and shape, the time it takes for each of the first three scan wires to pass through the beam is utilized in geometrically constructing a view of beam cross section. Focus is determined by employing both the upper and lower scan wires and calculating, by curve fitting, beam focal point. Beam directionality is determined by comparing beam position at the upper and lower scan levels. Beam energy is calculated after measuring current induced in the scan wires. In another embodiment, a pair of scanners, like those mentioned above, are carried on orthogonally translated belts.

This invention may be better understood with reference to the accompanying drawing in which.

Figure 1:
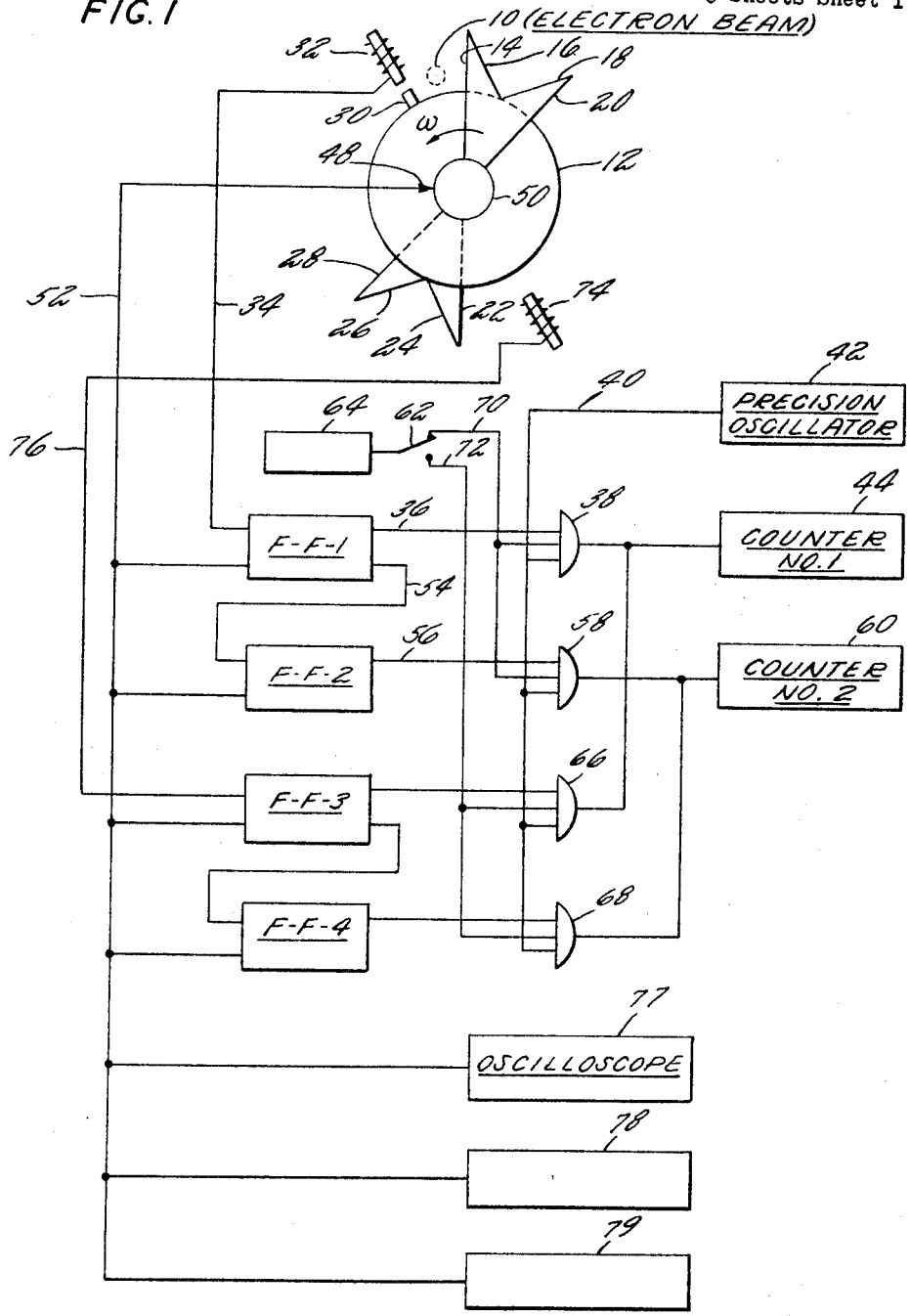
FIGURE 1 illustrates apparatus and associated circuitry for practicing this invention.

In FIGURE 1, an electron beam is shown normal to the paper at 10. The scanning means comprises a plurality of scan wires supported by and insulated from the upper and lower ends of a drum shaped member 12. Drum member 12 is positioned adjacent to and aligned with the axis of beam 10 and is caused to rotate by any conventional means. The scan wires extend outwardly from the drum 12 so as to intersect the beam when the drum rotates. The scan wires are arranged in obliquely oriented pairs so as to form the hypotenuse and one leg of a right triangle. Two pairs of these triangular configurations are arranged at the upper and lower ends of the drum. As shown in FIGURE 1, these pairs of triangular scan wire configurations are positioned so that the hypotenuse of each triangle meets to form a V. In FIGURE 1, the upper scan wire configuration is comprised of wires 14, 16, 18 and 20, while the lower configuration is comprised of scan wires 22, 24, 26 and 28. The scan wires are electrically connected to a slip ring 50 which is mounted on the hub of the drum. Also mounted on drum 12 is a magnetic pole piece 30. The beam location is described in polar coordinates as follows: As the drum rotates, pole piece 30 passes magnetic pick-up 32 causing a voltage to be induced in pick-up 32. This voltage pulse is transmitted via lead 34 to flip-flop 1 which is a bistable multivibrator and designated by the box F-F-1. This pulse sets flip-flop 1 so that an output signal appears as a potential on conductor 36. The potential on conductor 36 "opens" gate circuit 38. Gate circuit 38, as well as the other gate circuits, is preferably any one of a number of "and" gates which are well known in the computer art.

Also connected to gate circuit 38 via lead 40 is a precision fixed frequency oscillator 42. The output of this oscillator is a series of timing pulses. When gate 38 is in the "open" state because of the existence of a potential on conductor 36, these timing pulses are permitted to pass through the gate to counter 44. As drum 12 rotates and the first scan wire 14 crosses the electron beam, electrons in the beam are diverted to the scan wire which assumes a negative potential. Current will, therefore, flow through brush 48, which contacts slip ring 50 and conductor 52 to flip-flop 1, thereby resetting the flip-flop. This action removes the potential from conductor 36 thereby closing gate 38 and isolating oscillator 42 from counter 44. Hence, counter 44 has recorded the number of cycles from the oscillator during the time the drum has rotated, at constant angular velocity, W, from a position where the pole piece 30 and pick-up 32 are aligned, to the position of beam intersection by scan wire 14. For spatial reference, the scan wire, pole piece and magnetic pick-up relative angular locations must be known. The counter output may be converted to beam angular position using the formula:

$$\frac{WN}{f} = \text{angular position (radians) from a reference point}$$

$f$ = Oscillator frequency (c.p.s.)
$W$ = Drum angular velocity (rad./sec.)
$N$ = Counts (from counter)

When the pulse generated by the intersection of scan wire 14 and the beam resets flip-flop 1, flip-flop 2 (designated F-F-2) will be set by the appearance of a potential on output conductor 54 from flip-flop 1. This causes a potential to appear on conductor 56 which opens gate 58 thereby permitting counts from oscillator 42 to accumulate in counter 60. The second intersection of a scan wire with the electron beam occurs when drum 12 continues to rotate so as to cause scan wire 16 to intersect the beam. This second intersection with the electron beam causes a second pulse to appear on conductor 52. This pulse resets flip-flop 2 which in turn isolates counter 60 from oscillator 42. Counter 60 now has accumulated counts proportional to the radial position of the electron beam. That is, counter 60 will store a number of counts proportional to the time interval between intersection of the beam by scan wire 14 and the intersection by scan wire 16. The counts registered will be greater as the beam moves radially inward because of the scan wire geometry. Counters 44 and 60 now have stored counts indicative of the angular and radial position respectively of the electron beam. These counts may be operated on by computation circuits to give the beam location in polar coordinates or rectangular coordinates.

The same principle of operation discussed above is employed when detecting beam position at the lower level which is closer to the beam focal point. An inhibit switch 62 connects inhibit voltage supply 64 to gates 38 and 58 via conductor 70 or to gates 66 and 68 via conductor 72. With the inhibit switch in the position shown, gates 38 or 58 will pass counts from oscillator 42 whenever a potential appears on conductors 36 or 56 respectively. With inhibit switch 62 closed to the lower contact, a voltage is applied to conductor 72 and hence to gates 66 and 68. When pole piece 30 passes pick-up 74, a pulse will be induced therein and applied via conductor 76 to flip-flop 3. The operation of flip-flops 3 and 4, and gates 66 and 68, when the lower scan wires intersect the beam is the same as described above in connection with the upper scan wires. Now, however, the gate control pulses will be generated by intersection of scan wires 22 and 24 with the electron beam. As shown in FIGURE 1, the pulses from oscillator 42 which are gated by the intersection of the lower scan wires with the beam are, like the pulses gated by the upper scan wires, applied to counters 44 and 60. These counters have, of course, been reset either manually or automatically under the control of the reference pulse induced in pick-up 74. It is to be understood that, if it is desired to store the counts for a longer period of time, separate counters for gates 66 and 68 may be provided. A comparison of the beam location information signals generated by the upper and lower scan wires as they intersect the beam at different positions along the axis will describe the directionality of the beam axis.

Figure 2:
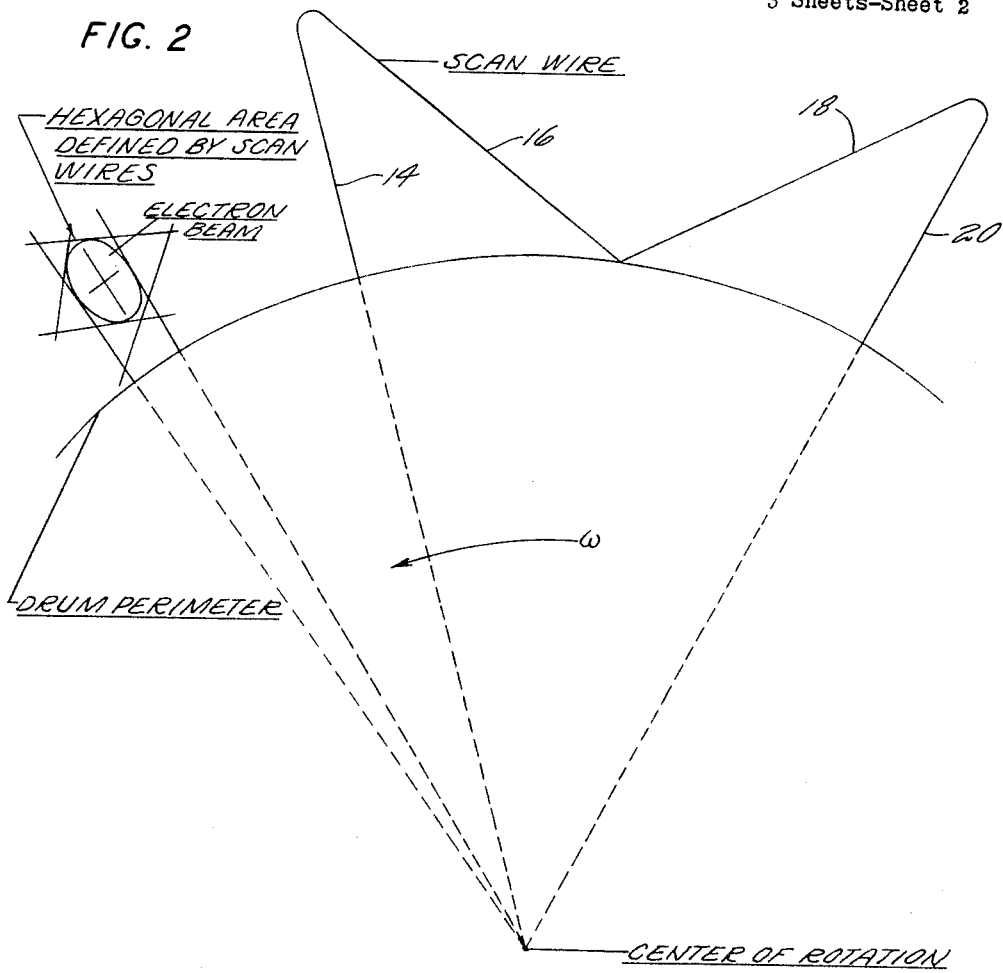
FIGURE 2 is an enlarged view of a portion of the scanning means illustrating how beam shape is determined.

Thus far, only the first two intersections of the scan wires on either level with the electron beam have been used. Now it will be shown how the first three wires 14, 16, 18 and/or 22, 24, 26 on any level can be used to measure beam shape, size, focus, and energy distribution. The fourth wires 20 and 28 on each level are simply radial supports for the third wires 18 and 26. The size and shape of the beam can be determined by measuring the width of the pulse from the first three wires. A wire will conduct a current as long as there are electrons hitting it. The pulse width may be measured and stored in pulse width measuring circuitry 78 or it may be displayed on an oscilloscope 77. When the first scan wire 14 passes under the beam, a pulse will be displayed on the oscilloscope. The width of this pulse minus the scan wire diameter defines two radial boundries of the beam. FIGURE 2 shows the geometry of the beam with respect to the scan wire location. The second and third wires, 16 and 18, also intersect the beam in turn and also define bounds of the beam. Because of the relative angular orientation of these three scan wires, the beam size is defined as that smooth shape drawn tangent to the interior boundries of the hexagon defined by the scan wires. It is essential, of course, that the radial position of the beam with respect to the drum be well defined to accurately define the beam shape. Knowing the radial position of the beam and the width of the pulse generated by intersection of each of the three scan wires with the beam, the hexagon defining the beam shape and size can be easily constructed.

Beam focus is determined by using beam shape information on both upper and lower levels. Knowing the distance between the upper and lower scan wire levels and the beam width at these levels, a simple triangulation can be used to establish the beam focus point. FIGURE 4 shows how this may be done with respect to the beam scanning structure shown in FIGURE 3. Beam focal point is calculated by using the following formula:

$$\frac{D_1}{D_2} = \frac{L_1 + L_2}{L_2}$$

where:
$D_1$—beam width at the upper scan wire
$D_2$—beam width at the lower scan wire
$L_1$—distance between scan wires
$L_2$—distance from lower scan wire to focus point.

When measuring energy distribution in the beam, what is really desired is energy density. This is expressed as:

$$E = \frac{VIt}{A}$$

Where V is the potential (voltage) drop, I is the current, $t$ is time and A is the beam area. Since V, the beam acceleration voltage, is known, and $t$ is only applicable to the beams effect on the target, the discussion of the beam energy can center around current density, $I/A$. Ideally, A should be unit area. However, it is sufficient to express the area and, hence, current density in terms of that area of the beam being intercepted by a scan wire. That is, current density is discussed in terms of a strip as wide as the scan wire. Therefore, the current density is determined by the current induced in each of the scan wires in each of two levels. This current can, of course, be measured by an ammeter 79.

Figure 3:
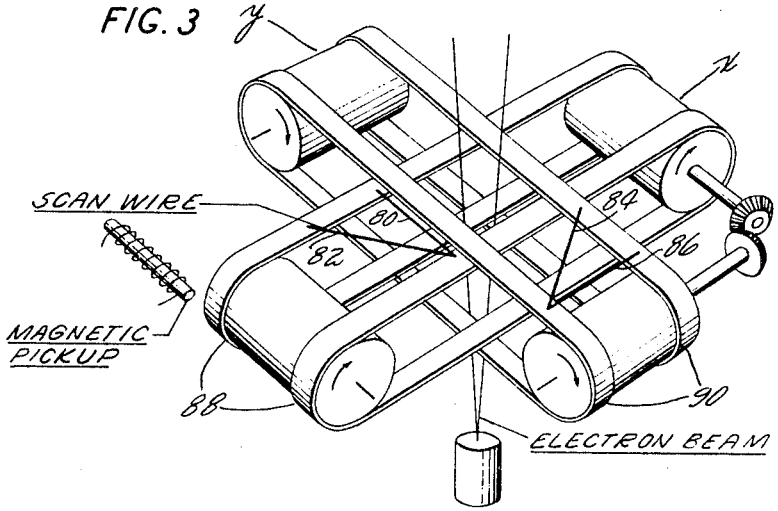
FIGURE 3 illustrates an alternate scanning means which may be used with the circuitry of FIGURE 1.
Figure 4:
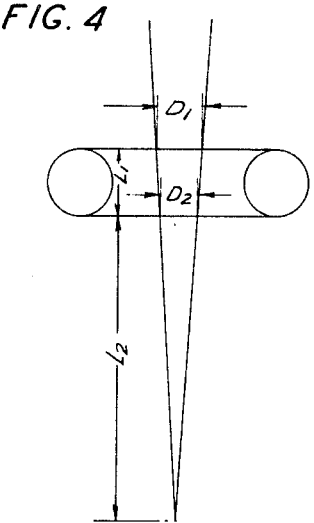
FIGURE 4 illustrates the technique for determining beam focus by using this invention.

Turning now to FIGURE 3, there is shown a scanning system which operates basically in the same manner as the system of FIGURE 1. However, the system of FIG- URE 3 will produce an output giving beam location directly in rectangular coordinates. In FIGURE 3, two pair of scan wires, 80, 82, and 84, 86, are shown fixed to conducting supporting belts which are driven at constant speed and orientated normal to each other. These belts, 88 and 90, drive the scan wires through the beam as did the rotary drum of FIGURE 1. A pair of brushes, not shown, are used to pick induced voltages off the belts and supply said voltages to indicating circuitry. By using belts the same scan wires are caused to intersect the beam on two different levels. The circuitry associated with the device of FIGURE 3 would be the same as that discussed in connection with the embodiment of FIGURE 1. Also, as with the device in FIGURE 1, the obliquely orientated scan wires will define beam size and shape. Multilevel scan for axis directionality and focus information is also provided with the device of FIGURE 3. All the factors and advantages given for the device in FIGURE 1 apply directly to the belt driven device of FIGURE 3 so that while the latter device serves to suggest an alternate feasible configuration, it is not to be construed as limiting the basic invention of obtaining beam information from scan wires which is herein claimed to be novel. Further, while the beam information obtained with this invention would, with the disclosed embodiments, be observed by an operator who would then manually adjust the beam, it is within the skill of the art to provide means for comparing this information with desired beam parameters and using error signals to automatically correct the beam.

We claim:

1. A device for measuring the parameters of the beam in an electron beam welding machine comprising:
    a plurality of scan wires arranged in pairs so as to form the hypotenuse and one leg of a plurality of right triangles;
    means for establishing a reference point;
    support means having said reference point establishing means and said pairs of scan wires affixed thereto, said reference point establishing means being displaced from a first of said scan wires by a predetermined distance;
    means mounted in the electron beam machine adjacent to said supporting means and responsive to the passage of said reference point establishing means for generating reference signals;
    means for imparting motion to said supporting means thereby causing said reference point establishing means to travel past said reference signal generating means and for then causing the beam to be intersected at two levels by pairs of scan wires in the order of leg, hypotenuse, hypotenuse, leg;
    means responsive to said reference signals and to the intersection of said scan wires with said beam for generating a series of gating signals;
    a source of timing signals;
    a plurality of counting means; and
    a plurality of gate means each connected to said source of said timing signals and responsive to said gating signals for passing timing signals to individual ones of said counting means in response to the generation of a gating signal.

2. A device for measuring the parameters of a beam of charged particles comprising:
    a plurality of scan wires arranged in pairs so as to form the hypotenuse and one leg of a plurality of right triangles,
    support means having said pairs of scan wires affixed thereto and extending therefrom in such a manner that the support means forms the second leg of said triangles,
    means for imparting motion to said support means thereby causing pairs of scan wires to intersect a beam of charged particles at two positions along the beam axis,
    means responsive to the intersection of each of said scan wires with said beam for producing a gating signal,
    a source of timing signals,
    a plurality of counting circuits, and
    a plurality of gate circuits responsive to said gating signals for passing pulses from said source of timing signals to associated counting circuits.

3. A device for measuring the parameters of a beam of charged particles comprising:
    means for generating a beam of charged particles,
    a plurality of sensing elements,
    means for imparting motion in planes perpendicular to the axis of the beam to said sensing elements thereby causing said plurality of sensing elements to intersect said beam at two positions along the beam axis,
    means responsive to the intersection of said sensing elements and said beam for producing control signals,
    means for producing timing signals, and
    means responsive to said control and timing signals for producing indications of the size, shape and energy content of said beam.

4. A device for measuring the parameters of a beam of charged particles comprising:
    means for generating a beam of charged particles a plurality of sensing elements,
    means for imparting motion in a plane perpendicular to the axis of the beam to said sensing elements thereby causing said plurality of sensing elements to intersect said beam in a predetermined sequence,
    means responsive to the intersection of said sensing elements and said beam for producing control signals,
    means for producing timing signals, and
    indicating means responsive to said control and timing signals for giving an indication of the size, shape and current density of said beam.

5. A device for sensing the parameters of a beam of charged particles comprising:
    means for generating a beam of charged particles,
    a first pair of scan wires arranged so as to form the hypotenuse and one leg of a first right triangle,
    a second pair of scan wires arranged so as to form the hypotenuse and one leg of a second right triangle,
    means positioned adjacent the beam axis and supporting said first and second pairs of scan wires in the same plane and in opposing orientation so that the hypotenuse of said first triangle meets the hypotenuse of said second triangle, and
    means for imparting motion to said supporting means whereby said scan wires are caused to intersect said beam with the leg of said first triangle first intersecting the beam.

6. A device for measuring the parameters of a beam of charged particles comprising:
    means for generating a beam of charged particles,
    a rotatable member positioned adjacent to the axis of a beam of charged particles,
    a first scanning means radially extending from said rotating member in a plane perpendicular to the axis of the beam generated by said generating means and at a first level along the beam axis,
    a second scanning means radially extending from said rotating member in a plane perpendicular to the axis of the beam generated by said generating means and at a second level along the beam axis,
    means for causing said rotatable member to rotate whereby said first and second scanning means are caused to intersect said beam, and
    means responsive to the intersection of said beam by said scanning means for producing indications of beam parameters.

7. An apparatus according to claim 6 in which the first and second scanning means each comprise two pairs of scan wires, the wires of each pair being obliquely oriented with respect to each other.

8. An apparatus according to claim 7 in which each pair of obliquely oriented scan wires forms the hypotenuse and one leg of a right triangle, said rotatable member forming the other leg of the triangle.

9. An apparatus according to claim 8 in which the two triangles formed by the two pair of scan wires on each level are affixed to said rotatable member by such a manner that the hypotenuse meet at the edge of said member.

10. An apparatus according to claim 6 in which the rotatable member has a reference point establishing means attached thereto and the device also includes means responsive to the passage of said reference point establishing means for generating a reference signal.

11. An apparatus according to claim 10 in which the means for producing indications of beam parameters comprises:
   means responsive to said reference signals and to the intersection of said beam by said scanning means for producing control signals,
   means for producing timing signals,
   a plurality of counters, and
   means responsive to said control signals for passing timing signals to said counters.

12. A device for measuring the parameters of a beam of charged particles comprising:
   a first pair of parallel continuous belts so positioned that the beam will pass therebetween twice,
   a second pair of parallel continuous belts located at right angles to said first pair of belts and so positioned that the beam will pass therebetween twice,
   a first scanning means carried by said first pair of belts,
   a second scanning means carried by said second pair of belts,
   means for driving said first and second belts whereby said first and second scanners are caused to serially intersect said beam on each of two levels along the beam axis, and
   means responsive to the intersection of said beam by said scanners for producing indications of beam parameters.

13. An apparatus according to claim 12 in which said first and second scanning means each comprise a pair of scan wires spanning the area between said belts, the wires comprising each pair being obliquely oriented with respect to one another.

14. An apparatus according to claim 13 in which each pair of obliquely oreinted scan wires forms the hypotenuse and one leg of a right triangle, one of said belts forming the other leg of the triangle.

15. An apparatus according to claim 12 in which one of said belts carries reference point establishing means and said device also includes means responsive to the passage of said reference point establishing means for generating a reference signal.

16. An apparatus according to claim 15 in which the means for producing indications of beam parameters comprises:
   means responsive to said reference signals and to the intersection of said beam by said scanning means for producing control signals,
   means for producing timing signals,
   a plurality of counters, and
   means responsive to said control signals for passing timing signals to said counters.

References Cited by the Examiner
UNITED STATES PATENTS

| | | | |
|---|---|---|---|
| 2,680,241 | 6/1954 | Gridley | 324—70 X |
| 2,705,742 | 4/1955 | Miller | 324—77 X |
| 2,985,876 | 5/1961 | Clough | 343—757 X |
| 3,145,025 | 8/1964 | Morrison | 324—70 X |
| 3,168,263 | 2/1965 | Kamm | 343—720 X |
| 3,207,982 | 9/1965 | Rose | 250—41.9 |

WALTER L. CARLSON, *Primary Examiner.*

E. L. STOLARUN, *Assistant Examiner.*